US011829499B2

(12) United States Patent
Janakiraman et al.

(10) Patent No.: US 11,829,499 B2
(45) Date of Patent: Nov. 28, 2023

(54) SECURING PIN INFORMATION USING OBFUSCATION BY APPLYING EXTRA SECURITY LAYER

(71) Applicant: Bank of America Corporation, Charlotte, NC (US)

(72) Inventors: Radha Janakiraman, Chennai (IN); Sandeep Kumar Chauhan, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 330 days.

(21) Appl. No.: 16/831,409

(22) Filed: Mar. 26, 2020

(65) Prior Publication Data

US 2021/0303716 A1 Sep. 30, 2021

(51) Int. Cl.
*G06F 21/62* (2013.01)

(52) U.S. Cl.
CPC .................. *G06F 21/6218* (2013.01)

(58) Field of Classification Search
CPC ................................... G06F 21/6218
USPC ........................................... 380/54
See application file for complete search history.

(56) References Cited

U.S. PATENT DOCUMENTS

| 5,828,956 A * | 10/1998 | Shirai | H04W 8/245 |
| | | | 455/418 |
| 6,044,156 A * | 3/2000 | Honsinger | H04N 1/32293 |
| | | | 380/54 |
| 6,286,761 B1 * | 9/2001 | Wen | G07C 9/253 |
| | | | 235/487 |

(Continued)

FOREIGN PATENT DOCUMENTS

| CN | 103606127 A | * | 2/2014 |
| CN | 105989569 A | * | 10/2016 |

(Continued)

OTHER PUBLICATIONS

Sainarayanan, K. S., J. V. R. Ravindra, C. Raghunandan, and M. B. Srinivas. "Coupling aware energy-efficient data scrambling on memory-processor interfaces." In 2007 International Conference on Industrial and Information Systems, pp. 421-426. IEEE, 2007. (Year: 2007).*

(Continued)

*Primary Examiner* — Luu T Pham
*Assistant Examiner* — Walter J Malinowski
(74) *Attorney, Agent, or Firm* — Banner & Witcoff, Ltd.

(57) ABSTRACT

An illustrative computing system for securely managing security information receives a request for security information. The computing system acquires the security information associated with the user and embeds the security information in a user selected image. The computing system modifies the image based on a user selected identifier to scramble the location of pixels. The computing system encrypts and transmits the image. The computing system decrypts the image at the user interface. The computing system modifies the image based on the user selected identifier to descramble the pixels. The computing system displays the image at the user interface with a plurality of images for user selection. Based on the image selected by the user, the computing system extracts security information from the image. The computing system displays the requested security information at the user interface.

19 Claims, 6 Drawing Sheets

(56) References Cited

U.S. PATENT DOCUMENTS

| | | | | |
|---|---|---|---|---|
| 6,456,724 | B1* | 9/2002 | Watanabe | G06T 1/0035 380/54 |
| 6,536,665 | B1* | 3/2003 | Ray | G06Q 20/347 235/382 |
| 8,051,180 | B2* | 11/2011 | Mazzaferri | G06F 9/5088 709/227 |
| 10,516,623 | B2* | 12/2019 | Leafe | G06F 9/00 |
| 2001/0022848 | A1* | 9/2001 | Rhoads | G07F 7/086 704/E19.009 |
| 2004/0118916 | A1* | 6/2004 | He | G06K 7/0004 235/383 |
| 2004/0260625 | A1* | 12/2004 | Usami | G06Q 30/0643 705/26.8 |
| 2010/0074443 | A1* | 3/2010 | Ishii | G09C 5/00 380/243 |
| 2010/0191972 | A1* | 7/2010 | Kiliccote | G06F 21/606 713/172 |
| 2011/0007348 | A1* | 1/2011 | Yamaizumi | G06F 21/6209 358/448 |
| 2011/0087591 | A1* | 4/2011 | Barnett | G06Q 20/40 705/44 |
| 2012/0246079 | A1* | 9/2012 | Wilson | G06Q 20/3226 705/67 |
| 2013/0212704 | A1* | 8/2013 | Shablygin | G06F 21/6218 726/28 |
| 2013/0242729 | A1* | 9/2013 | Chen | H04L 1/1835 370/329 |
| 2013/0283055 | A1* | 10/2013 | Dettinger | G06F 21/16 713/176 |
| 2014/0016107 | A1* | 1/2014 | Coulson | H04N 9/3194 353/121 |
| 2014/0214688 | A1* | 7/2014 | Weiner | G06Q 20/3227 705/71 |
| 2015/0082460 | A1* | 3/2015 | Amiga | H04L 63/145 726/28 |
| 2019/0340283 | A1* | 11/2019 | Schneider | G06F 16/9535 |
| 2020/0193408 | A1* | 6/2020 | Hadley | G06Q 20/3821 |
| 2022/0043890 | A1* | 2/2022 | Choi | H04L 63/10 |

FOREIGN PATENT DOCUMENTS

| | | | | |
|---|---|---|---|---|
| EP | 1096429 A2 * | 5/2001 | | G07B 17/00508 |
| EP | 2169942 B1 * | 6/2016 | | G06F 21/83 |
| JP | 2004078864 A * | 3/2004 | | |
| JP | 2004078864 A | 3/2004 | | |
| JP | 3814508 B2 * | 8/2006 | | G06F 21/62 |
| JP | 2008003883 A * | 1/2008 | | |
| JP | 4103396 B2 * | 6/2008 | | G22B 19/122 |
| WO | WO-0019365 A1 * | 4/2000 | | G07C 9/00039 |
| WO | WO-2005027501 A1 * | 3/2005 | | G06T 1/005 |
| WO | WO-2005083545 A1 * | 9/2005 | | G06F 21/31 |
| WO | WO-2014134180 A2 * | 9/2014 | | G06Q 20/105 |
| WO | WO-2017105113 A1 * | 6/2017 | | G06F 21/606 |

OTHER PUBLICATIONS

Denning, Dorothy E., and Peter J. Denning. "Data security." ACM Computing Surveys (CSUR) 11, No. 3 (1979): 227-249. (Year: 1979).*

Hussain, Mehdi, Ainuddin Wahid Abdul Wahab, Yamani Idna Bin Idris, Anthony TS Ho, and Ki-Hyun Jung. "Image steganography in spatial domain: A survey." Signal Processing: Image Communication 65 (2018): 46-66. (Year: 2018).*

Korshunov, Pavel, and Touradj Ebrahimi. "Scrambling-based tool for secure protection of JPEG images." In 2014 IEEE international conference on image processing (ICIP), pp. 3423-3425. IEEE, 2014. (Year: 2014).*

Murugesh, Rishigesh. "Advanced biometric ATM machine with AES 256 and steganography implementation." In 2012 Fourth International Conference on Advanced Computing (ICoAC), pp. 1-4. IEEE, 2012. (Year: 2012).*

Rezaei, Mohammad, and Saeed Montazeri Moghaddam. "Scramble and Transform: An Image Data Hiding Technique." In 2019 27th Iranian Conference on Electrical Engineering (ICEE), pp. 1874-1878. IEEE, 2019. (Year: 2019).*

* cited by examiner

SECURING PIN INFORMATION USING OBFUSCATION BY APPLYING EXTRA SECURITY LAYER

BACKGROUND

Aspects of the disclosure relate to secure communication of sensitive or non-public information within a computing environment. In particular, one or more aspects of the disclosure relate to a system providing generation, encryption, and communication of security information through one or more electronic access methods.

Many enterprise organizations (e.g., business organizations, educational institutions, governmental entities, and the like) use electronic communication platforms to communicate private or non-public information between computing devices within the enterprise computing network and/or via an external network connection. In some cases, because of the private nature of the information communicated, procedures may be used to maintain data security and to protect access to private information as it is stored, transmitted, and received. As such, an organization may implement secure communication channels to maintain data security. In some cases, user access may be controlled through use of unique security information associated with each user. In some cases, security information may be communicated to the individual using a traditional paper method via a mail service, with the security information hidden through use of secure paper where the information is not viewable from outside an envelope. Further, some organizations may utilize electronic communications (e.g., email, text messages, websites and/or other such electronic communications) to communicate security information for use in controlling access to an individual's private information. However, current communication methods may allow for an unauthorized user to intercept the communicated security information.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, fast, reliable, and convenient technical solutions that address and overcome the technical problems associated with secure communication of security information to an entity within a computing environment.

Organizations (e.g., educational institutions, financial institutions, government organizations, business organizations, and the like) may provide a secured interface to allow users to securely access electronically stored private and/or non-public information (e.g., a user account, personal information, health information, and the like) and/or access to other applications and/or services that may use such private and/or non-public information. For example, the business organization may provide a security identifier, such as a personal identification number (PIN), to the user for use when opening a secure communication channel for use in accessing data over the secured interface. In the past, business organization may have provided a security identifier through physical delivery (e.g., a mailer utilizing security paper) and/or digital delivery via an electronic message or other user interface where users may receive their security identifier. To avoid a risk that unauthorized individuals and/or groups may intercept delivery of the security information, additional security methods may be used to further encrypt the security identifier, such as by using an image-key pairing.

For example, a user may select an image for use as a secret image in a personalized image-key pairing, such as by selecting an image via a user interface screen and/or by uploading an image via a communication interface. The image selection may be done during an online registration process or at another time when the user is accessing the organization's network via a secure connection. A user may also input a user identifier during an online registration process or at another time when the user is accessing the organization's network via a secure connection. When the organization generates and/or retrieves a security identifier at a user's request, the user's secret image may be retrieved from a secure data repository in the enterprise computing system for use when creating an image-key pairing. For example, the security identifier requested by the user and/or enterprise computing system may be embedded within the user's secret image.

In some cases, the security identifier may be embedded within one or more predetermined pixel areas of the user's secret image (e.g., the corners, the center, the sides, and the like). In some cases, the security identifier may be embedded by use of one or more data hiding algorithms, such as a least significant bit (LSB) substitution method, where a binary representation of the pixels of the user's secret image may be modified with information corresponding to the security identifier. After embedding the security identifier into the user's secret image, the enterprise computing system may retrieve a unique identifier associated with the user (e.g., an identification number, a user name, and the like) from a secure data repository in the enterprise computing system. In some cases, the pixels and/or groups of pixels of the embedded user image may be scrambled based on the user's identifier to produce a scrambled image. In some cases, the scrambled image may be additionally encrypted. The scrambled image may be stored in a secure data repository in the enterprise computing system. In some cases, an enterprise computing system may access the scrambled image from the secure data repository to present the user image to the user via a user interface (e.g., a webpage, an email message, and the like).

In some cases, the enterprise computing system may access the scrambled image from the secure data repository and may decrypt the image, if necessary. After decryption of the scrambled image, the enterprise computing system may retrieve the user's unique identifier from a secure data repository in the enterprise computing system. The enterprise computing system may perform descrambling operations based on the user's unique identifier to produce the embedded image (e.g., the user's secret image with the embedded security identifier). The embedded image may then be displayed via the user interface with one or more different images for presentation to the user. Once displayed, the user may select an image from the images presented, including the embedded image and the one or more alternate images via a user computing device. The user interface may additionally display instructions for the user to select the user's secret image (e.g., the image selected by the user at registration), if available. If an alternate image is selected (e.g., the user's secret image was not selected), the enterprise computing system may allow for one or more additional image selections at the user interface. In some cases, the enterprise computing system may disable the selection of an image at the user interface, discard the user's secret image, and terminate the communication of the security identifier.

If the user's secret image (e.g., the image containing the embedded security identifier) is selected at the user interface, the enterprise computing system may extract the embedded security identifier from the embedded image. The enterprise computing system may extract the embedded security identifier using an inverse algorithm to the one used for embedding the security information in the image (e.g., inverse LSB substitution methods). After extracting the embedded security identifier from the embedded image, the enterprise computing system may provide the security identifier to the user, such as by displaying the security identifier via the user interface.

These features, along with many others, are discussed in greater detail below.

BRIEF DESCRIPTION OF THE DRAWINGS

The present disclosure is illustrated by way of example and not limited in the accompanying figures in which like reference numerals indicated similar elements in which.

DETAILED DESCRIPTION

Figure 1:
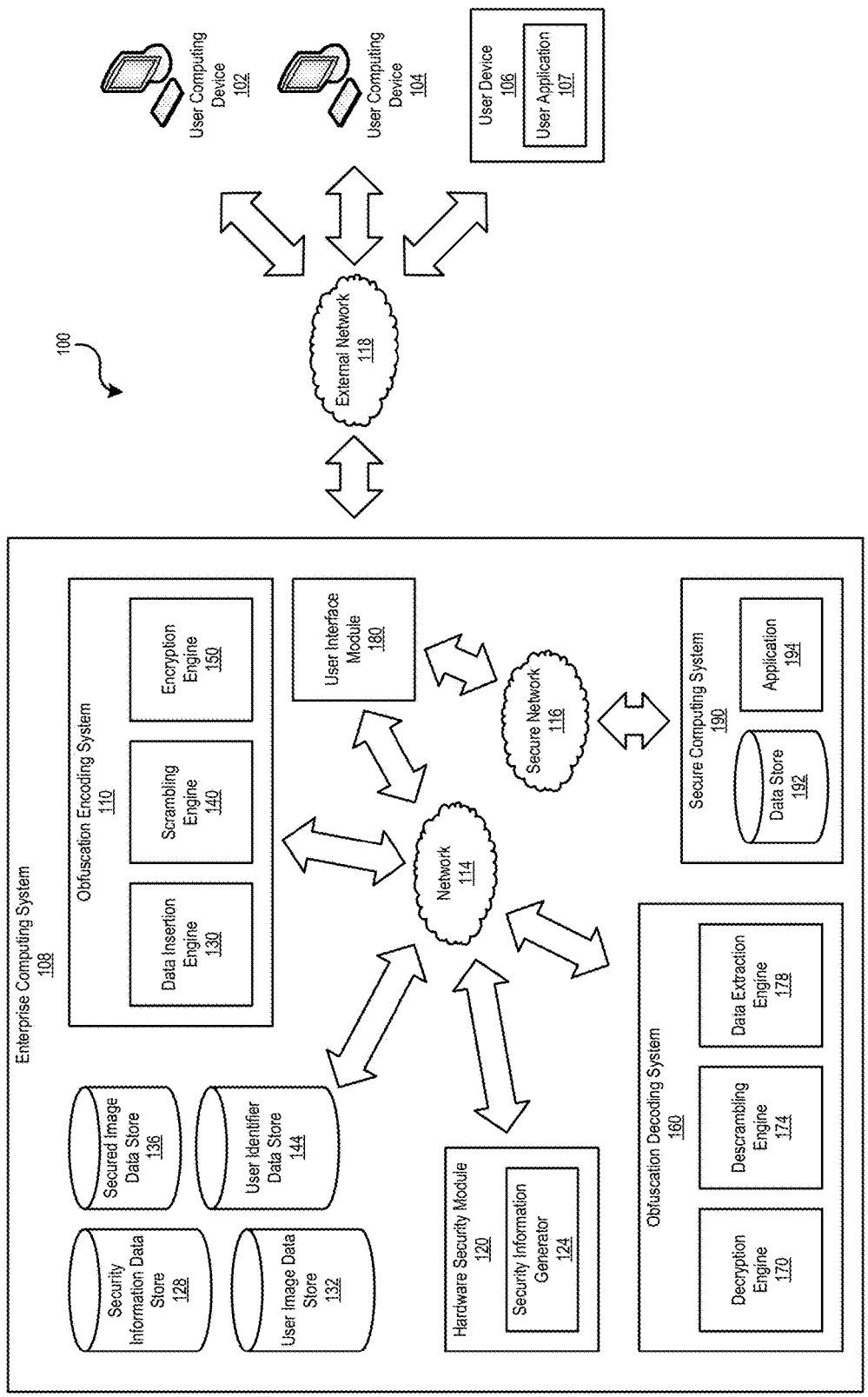
FIG. 1 depicts an illustrative computing environment for securing security information according to aspects of this disclosure.

In the following description of various illustrative examples, reference is made to the accompanying drawings, which form a part hereof, and in which is shown, by way of illustration, various examples in which aspects of the disclosure may be practiced. It is to be understood that other structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some illustrative arrangements in which the systems described herein may be used. Various other arrangements employing aspects described herein may be used without departing from the present disclosure.

A need has been identified for an improved and robust system capable of securely communicating security information to a user of an enterprise organization. Aspects described herein are directed to developing a system for securely communicating security information to a user computing device using encoding and decoding procedures.

In some cases, enterprise organizations (e.g., a financial institution, a health care provider, a governmental agency, an educational institution, a business organization, and the like) may utilize various resources to manage the private information of users of the enterprise organization. Situations may arise where a user requires access to private information and must provide security information to be granted access (e.g., authenticate access an application, verify an identity, input a password, and the like). Security information associated with a user may include a government issued identification number, a driver's license number, an account number, a PIN, a password, a one-time verification code, and the like. Many enterprise organizations provide direct access to security information through email communication systems, text messaging communications, instant messaging communications, webpages, and paper mail communications. However, such methods may be susceptible to interception and/or access by unauthorized individuals and/or groups who seek to obtain access to a user's private information through use of their security information. As such, more secure methods of communicating security information to a user and ensuring secure receipt of the security information at an end user computing device.

In some cases, a user may register with an enterprise organization, such as when configuring access to private information, such as during an account set-up procedure. Registration may include assignment of security information (e.g., a PIN) to the user or use when accessing the private information, along with additional registration information (e.g., a user profile, a registration number, and the like). At registration, the user may select an image for use during a user identification process from one or more images provided by the enterprise organization. Additionally or alternatively, the user may provide an image for association with the user. Further, the user may provide a user identifier for association with the user. The user identifier may be numerical (e.g., a passport number, a driver's license number, a government issued identification number, and the like). In some cases, the user identifier may have a minimum and/or maximum allowed number of characters. For example, the user identifier may be required to be 2 numerical characters. The selected image and the user identifier may be stored in one or more data stores and associated with the user.

In some cases, the user may request the enterprise organization for the security information to allow access to secure or private information or applications provided through use of the enterprise computing system. For example, a user who has a bank account with a financial institution may have forgotten their PIN and may be unable to access their bank account. As such, the user may request that a PIN be provided, such as through use of a website associated with the financial institution. In some cases, a request to access an application or other secure functionality provide by the enterprise computing system may trigger a request for the user to input security information to positively identify the user. For example, a user with a subscription to an application associated with a business organization may require a one-time verification code to login to their user account to access the application. In this case, the enterprise computing system associated with the business organization may trigger a request to provide such security information.

After receiving a request for security information from a user and/or enterprise computing system, an obfuscation encoding system may generate and/or retrieve the requested security information (e.g., PIN information). In some cases, such security information may be stored in one or more data stores in the enterprise computing system. Additionally or alternatively, the enterprise computing system may generate the security information. After generation and/or retrieval of security information, the obfuscation encoding system may retrieve a user-selected image (e.g., the image associated with the user during registration) from one or more data stores in the enterprise computing system. After retrieval of the selected image, the obfuscation encoding system may embed the generated and/or retrieved security information into the selected image to form an embedded image. For example, the security information may be embedded such as by using LSB substitution methods or other methods involving modification of the bit sequences of the pixels and/or groups of pixels of the selected image.

After embedding the security information into the selected image, the obfuscation encoding system use the user identifier (e.g., the user identifier provided by the user during registration) from one or more data stores in the enterprise computing system. Based on the retrieved user identifier, the obfuscation encoding system may scramble the pixels and/or groups of pixels of the embedded image, using the user identifier in the scrambling procedure. In some cases, after scrambling of the locations of the pixels and/or groups of pixels of the embedded image, the scrambled image may be encrypted by the obfuscation encoding system, such as by using a public key or a private key associated with the user. After encryption of the scrambled image, the scrambled image may be stored in a secured image data store within the enterprise computing system.

If the scrambled image was encrypted prior to storage by the obfuscation encoding system, an obfuscation decoding system may acquire the scrambled image from the secured image data store and decrypt the scrambled image using a private key associated with the user. The obfuscation decoding system may retrieve the user identifier provided by the user during registration from one or more data stores in the enterprise computing system. Based on the user identifier, the obfuscation decoding system may use one or more descrambling methods to reproduce the embedded image. If a different user identifier is used in the descrambling process that does not match the identifier originally used to scramble the pixels and/or groups of pixels of the image, then the resulting image may not represent the image selected by the user during registration (e.g., an image with scrambled pixels and/or groups of pixels).

After the scrambled image is descrambled by the obfuscation decoding system, the embedded image may be presented to the user via a user interface screen alongside other images for selection by the user. For example, the embedded image (e.g., the image containing the embedded security information) may be displayed with a number of alternate images (e.g., 9 images, 5 images, 3 images, and the like). In some cases, the user interface screen may display instructions for the user to select the embedded image (e.g., the image selected by the user during the registration process), along with the corresponding user-selectable inputs. If the user selects an alternate image, the enterprise computing system and/or a user interface module may allow one or more additional attempts for the user to select the embedded image. If the user selects the correct embedded image, the obfuscation decoding system may extract the embedded security information from the embedded image. Such extraction of the security information from the embedded image may include application of inverse LSB substitution methods, or other such methods corresponding to the methods originally used to embed the security information. After extracting the security information from the embedded image, the user interface module may cause display of the security information to the user via a user interface screen. In some cases, the security information may be sent via a different communication channel, such as through a text messaging system or email communication system, that may have been previously authenticated by the user.

FIG. 1 depicts an illustrative computing environment 100 for securing private information according to aspects of this disclosure. In some cases, the illustrative computing environment 100 may include an enterprise computing system 108 communicatively coupled to one or more computing devices (e.g., the user computing device 102, the user computing device 104, the user device 106) via one or more networks (e.g., the external network 118). In some cases, the user computing device 102, user computing device 104, and user device 106 may be one of a mobile device, a tablet, a laptop computer, a desktop computer, and/or another such computing device capable of communicating via the external network 118 (e.g., a telecommunications network, the Internet, a Wi-Fi network, and the like) to allow the user to access data and/or utilize networked applications provided through the enterprise computing system 108. User device 106 may include one or more user applications (e.g., a user application 107), which may provide access to the user interface module 180 via one or more networks (e.g., the external network 118). In some cases, the external network 118 may be a wired or wireless network, such as the networks described below with respect to FIGS. 4 and 5.

In some cases, the enterprise computing system 108 may include a user interface module 180 to coordinate communication between components of the enterprise computing system 108 and one or more external computing devices. In some cases, the user interface module 180 may be used to manage user access to one or more applications or data of a secure computing system 190 via one or more networks (e.g., a network 114, a secure network 116). The network 114 and the secure network 116 may be a wired or wireless network, such as the networks described below with respect to FIGS. 4 and 5. In some cases, the enterprise computing system 108 may include one or more data stores (e.g., a security information data store 128, a user image data store 132, a secured image data store 136, and a user identifier data store 144) communicatively couple to one or more networks (e.g., a network 114). The security information data store 128 may contain identification information (e.g., a name, a date of birth, an address, an age, a username, and the like) for one or more users registered with the enterprise organization paired with security information (e.g., passwords, PINs, security keys, and the like) associated with the one or more users.

In some cases, the user image data store 132 may contain one or more images associated with the one or more users registered with the enterprise organization. The one or more images may be selected by and/or associated with a user during the user's registration with the enterprise computing system 108. In some cases, a user's selected image stored in the user image data store 132 may be changed to a different selected image by the user at their request. In some cases, the user may be required to change their selected image periodically (e.g., every week, month, year) as directed by the enterprise computing system 108. The images available for selection by the user may be predetermined by the enterprise organization. In some cases, a user may upload or otherwise provide an image (e.g., an image associated with the user) to be stored in the user image data store 132. One or more of the selected images in the user image data store 132 may have a fixed format requirement (e.g., .png, .gif, .jpg, and the like). One or more of the selected images in the user image data store 132 may have fixed formatting requirements for dimensions and/or resolution. For example, one or more of the selected images in the user image data store 132 may have a maximum required size of 10 kilobytes (kB). In some cases, one or more of the selected images in the user image data store 132 may have requirements for variation (e.g., noise) in the pixels of the one or more selected images. For example, an image that is a single color with no discernable features may not meet the requirements for a selected image associated with a user in the user image data store 132.

In some cases, the secured image data store 136 may contain one or more scrambled and/or encrypted images. The one or more scrambled and/or encrypted images in the secured image data store 136 may originate from the obfuscation encoding system 110 and may be available for access, modification, and/or acquisition by one or more elements of the enterprise computing system 108 (e.g., the obfuscation encoding system 110, the obfuscation decoding system 160, the user interface module 180, etc.). For example, after the obfuscation encoding system 110 encrypts a scrambled image, the obfuscation encoding system 110 may store the encrypted image in the secured image data store 136, so that the obfuscation decoding system 160 may access the encrypted image and proceed to decode the image at the user interface module 180.

In some cases, the user identifier data store 144 may contain one or more user identifiers associated with the one or more users registered with the enterprise organization operating the enterprise computing system 108. The one or more user identifiers may be selected by an associated user during the user's registration with an enterprise organization. In some cases, a user's associated user identifier stored in the user identifier data store 144 may be changed to a different user identifier by the user at their request. In some cases, the user may be required to change their associated user identifier periodically (e.g., every week, month, year) as directed by the enterprise computing system 108. In some cases, the user identifier may numerical. In some cases, the user identifier may be fixed at 2 digits. The user identifier may be a number unique to the user (e.g., the last two digits of government issued identification number, a driver's license number, a passport number, and the like). For example, for a user with a driver's license number of "123456789", the user identifier selected by the user and stored in the user identifier data store 144 may be "89". The user identifier may be stored with information to associate the user identifier to a user (e.g., a name, a date of birth, an address, an account number, a username, a government issued identification number, and the like). In some cases, the user identifier may be textual, where a numerical value (e.g., an American Standard Code for Information Interchange (ASCII) value) may be associated with each character.

In some cases, the enterprise computing system 108 may include an obfuscation encoding system 110 communicatively coupled to one or more networks (e.g., the network 114). The obfuscation encoding system 110 may be configured to encode and/or embed security information into images, modify the images within the obfuscation encoding system 110, and communicate the images outside the obfuscation encoding system 110. In some cases, the obfuscation encoding system 110 may include a data insertion engine 130. The data insertion engine 130 may be configured to embed security information (e.g., a PIN) into a selected image. The data insertion engine 130 may embed security information into a selected image through the application of LSB substitution methods. In some cases, LSB substitution methods may include modifying a selected image by modifying one or more individual bits of one or more pixels of the selected image. The modified bits of the one or more bits of the one or more pixels of the selected image may store the security information. For example, in order to store the numerical value of "7", the numerical value may be converted to the 8-bit ASCII representation of "00000111". Each digit of the 8-bit binary representation of "7" may be stored in the least significant bits of the binary representation of the one or more pixels in the selected image. In some cases, the binary representation of a pixel may vary in size depending on the file format of the image and the types of pixels in the image (e.g., 8-bit RGB (Red-Green-Blue), 24-bit RGB, 8-bit grayscale). The data insertion engine 130 may be configured to modify specific groups of pixels of a selected image. For example, the data insertion engine 130 may be configured to perform LSB substitution on the last column of pixels (e.g., right most column).

In some cases, the obfuscation encoding system 110 may include a scrambling engine 140. The scrambling engine 140 may be configured to scramble the location of the pixels and/or groups of pixels of a selected image. The obfuscation encoding system 110 and/or the scrambling engine 140 may retrieve the associated user identifier from the user identifier data store 144. The scrambling engine 140 may use the user identifier as a for use in scrambling the pixels and/or groups of pixels of the image. For example, where "N" is the user identifier, the scrambling engine 140 may divide the image into "N" modulus 10 parts (e.g., the number of parts is the remainder of dividing the user identifier by 10). The image may be divided into parts of equal or varying size. The scrambling engine 140 may scramble the locations of the parts. For example, for "N=45", the image would be divided into 45 modulus 10=5 parts (e.g., groups of pixels). The 5 parts of the image may be interchanged into different positions using a specific pattern and/or randomly. Alternate scrambling techniques involving the pixels and/or groups of pixels may be applied to a selected image without departing from the present disclosure. In some cases, the obfuscation encoding system 110 may include an encryption engine 150. The encryption engine 150 may be configured to encrypt the image before transmission of the image to a destination outside the obfuscation encoding system 110. For example, the image may be encrypted using Pretty Good Privacy (PGP) encryption techniques, where the encryption engine 150 uses a public key associated with the user for encryption of the image data.

In some cases, the enterprise computing system 108 may include a computing device configured to manage security information generations, such as a hardware security module 120. The hardware security module 120 may be a computing device configured to manage secure information within the enterprise computing system 108 by safeguarding digital keys (e.g., passwords, PINs, security keys, and the like). The hardware security module 120 may include cryptographic processing functionality. The hardware security module 120 may be resistant to tampering by applications and devices within the enterprise computing system 108. In some cases, the hardware security module 120 may include the security information data store 128. In some cases, the hardware security module 120 may include a security information generator 124. The security information generator 124 may be configured to securely generate random security information (e.g., PIN information, passwords, one-time verification codes). The security information may be generated after one or more requests for security information are received and/or initiated by the enterprise computing system 108. Requests for security information may originate from one or more user computing devices (e.g., 102, 104) and/or user devices (e.g., 106) via one or more networks (e.g., the network 114, the external network 118). In some cases, the security information generator 124 may receive one or more requests for security information via a user interface module 180 in the enterprise computing system 108. In some cases, the security information generator 124 may be configured to generate security information of a specific length and specific character composition. For example, the security information generator 124 may be configured to generate PINs that are numerical and 10 digits in length (e.g., "0123456789"). While a hardware security module 120 may allow for efficient management and/or generation of security information, other devices may be contemplated such as a server configured to perform a variety of similar cryptologic functions.

In some cases, the enterprise computing system 108 may include an obfuscation decoding system 160 communicatively coupled to one or more networks (e.g., the network 114). In some cases, the obfuscation encoding system 110 and obfuscation decoding system 160 may be combined and/or have their functionality combined into a single computing system. The obfuscation decoding system 160 may be configured to decode security information from one or more images. In some cases, the obfuscation decoding system 160 may include a decryption engine 170. The decryption engine 170 may be configured to decrypt an encrypted image. The encrypted image may be received via one or more networks (e.g., the network 114). For example, a PGP encrypted image containing embedded security information may be decrypted using PGP decryption techniques, where the decryption engine 170 uses a private key associated with the user to decrypt the encrypted image. In some cases, the private key may be associated with a user computing device (e.g., 102), user device (e.g., 106), and/or user login information for the user associated with the requested security information. In some cases, the private key for decryption of the encrypted image may be made available for use by the decryption engine 170 from the associated device via one or more networks (e.g., the network 114). In some cases, the private key for decryption of the image may be made available for the decryption engine 170 by the user interface module 180 via one or more networks (e.g., the network 114).

In some cases, the obfuscation decoding system 160 may include a descrambling engine 174. The descrambling engine 174 may be configured to descramble the location of the pixels and/or groups of pixels of the scrambled image. The descrambling engine 174 may inverse the operations previously performed by the scrambling engine 140. The obfuscation decoding system 160 and/or the descrambling engine 174 may retrieve the associated user identifier from the user identifier data store 144 via one or more networks (e.g., the network 114). Based on the user identifier and specific pattern and/or random technique used by the scrambling engine 140 to alter the location of the pixels and/or groups of pixels of the image, the descrambling engine 174 may descramble the pixels and/or groups of pixels of the scrambled image. For example, using the associated user identifier, the descrambling engine 174 may operate on the scrambled image to produce the embedded image (e.g., the selected image from the user image data store 132 with embedded security information). An image that was divided into 5 parts (e.g., groups of pixels) with each part placed in a random location may be reordered into the original orientation of the selected image.

In some cases, the obfuscation decoding system 160 may include a data extraction engine 178. The data extraction engine 178 may be configured to extract security information (e.g., a PIN) from an image. The data extraction engine 178 may extract security information from the image through the application of inverse LSB substitution methods. The data extraction engine 178 may use inverse LSB substitution methods in accordance with the LSB substitution methods of the data insertion engine 130. In some cases, inverse LSB substitution methods may include analyzing the bit representation of an image at specific pixels of the image and/or extracting the binary representation of the security information at the defined bit locations within the image. For example, in order to extract the embedded numerical value of "7" from 24-bit RGB pixels by inverse LSB substitution, 3 pixels (3 red, 3 green, 3 blue) of the image will be analyzed and have bit information extracted. The data extraction engine 178 may be configured to extract bit information from the specific pixels where security information was embedded by the data insertion engine 130.

In some cases, the user interface module 180 may exist at a networked destination in the enterprise computing system 108 accessible via one or more networks (e.g., the network 114, secure network 116, external network 118) for one or more user computing devices (e.g., 102, 104) and/or user devices (e.g., 106). In some cases, the user interface module 180 may be accessible via one or more user applications (e.g., 107) included in one or more user devices (e.g., 106). In some cases, the user interface module 180 may be accessed by the obfuscation encoding system 110 and/or the obfuscation decoding system 160 via one or more networks (e.g., the network 114). The user interface module 180 may allow user input from one or more user computing devices (e.g., 102, 104) and/or user devices (e.g., 106). The user interface module 180 may be accessed via a uniform resource locator (URL) with the purpose of directing a browser, or other computing application (e.g., an email client platform), to linked content via one or more networks (e.g., the network 114, the secure network 116, the external network 118). Additionally or alternatively, in some cases, the user interface module 180 may be included directly and/or embedded in one or more electronic access methods (e.g., email messages, text messages, websites, applications, and/or other such electronic communications) accessible by one or more user computing devices (e.g., 102, 104) and/or user devices (e.g., 106).

In some cases, the enterprise computing system 108 may include one or more secure computing systems (e.g., the secure computing system 190). Secure computing system 190 may include one or more data stores (e.g., the data store 192) and one or more applications (e.g., application 194). The secure computing system 190 may be communicatively coupled to one or more networks (e.g., the secure network 116). The secure computing system 190 may contain private information that one or more user computing devices (e.g., 102, 104) and/or user devices (e.g., 106) attempts to access. For example, a user may attempt to access a trading application (e.g., the application 194) in the secure computing system 190, where the trading application requires the user to input security information before granting the user access. Additionally or alternatively, for example, a user may attempt to access their account balance for a bank account, where information associated with the account balance is contained in a data store (e.g., data store 192) of the secure computing system 190. The secure computing system 190 may be accessible by the user interface module 180, where one or more user computing devices (e.g., 102, 104) and/or user devices (e.g., 106) access the secure computing system 190 of the enterprise computing system 108 via one or more networks (e.g., the secure network 116, the external network 118).

Figure 2:
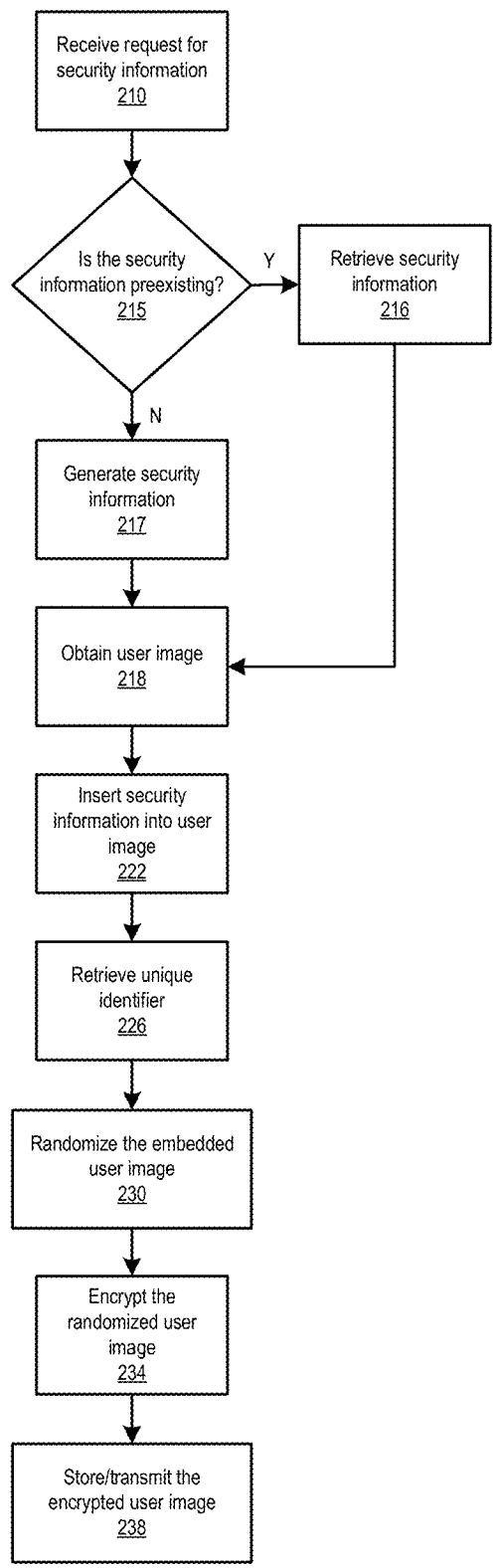
FIG. 2 depicts an illustrative event sequence for encoding and storage of security information according to aspects of this disclosure.

FIG. 2 depicts an illustrative event sequence for encoding and storage of security information according to aspects of this disclosure. The events shown in the illustrative event sequence are illustrative and additional events may be added, or events may be omitted, without departing from the scope of the disclosure. At 210, a request for security information may be received by the obfuscation encoding system 110. The request for security information may be initiated by one or more user computing devices (e.g., 102, 104) and/or user devices (e.g., 106) via one or more networks (e.g., the external network 118). In some cases, the request may originate from one or more user computing device inputs at the user interface module 180 via one or more networks (e.g., the network 114). For example, a user operating the user computing device 102 may access the user interface module 180 and incorrectly enter their password to an account, where the user interface module 180 would automatically trigger the enterprise computing system 108 to initiate password reset sequence (e.g., transmit a new password to the user) after a number of incorrect password attempts. In some cases, the enterprise computing system 108 may initiate a request for security information based on user activity with the user interface module 180 and secure computing system 190. For example, a user operating the user device 106 may access the user interface module 180 (e.g., a website associated with an enterprise organization) via the user application 107 and submit a request for their security information related to an account login. The user interface module 180 may communicate the request for security information to the obfuscation encoding system 110 via one or more networks (e.g., the network 114).

At 215, the obfuscation encoding system 110 may determine whether the security information requested is preexisting in the security information data store 128. The obfuscation encoding system 110 may search the security information data store 128 for security information corresponding to the information requested by the user computing device (e.g., 102, 104), user device (e.g., 106), and/or enterprise computing system 108. For example, the obfuscation encoding system 110 may search the security information data store 128 and find PIN information associated with a user identifier (e.g., a username, an account number, a government issued identification number) corresponding to the request for security information. After determining the security information requested by the user is preexisting, at 216, the obfuscation encoding system 110 may retrieve the security information from the security information data store 128. If, at 215, the obfuscation encoding system 110 determines that the security information is not preexisting in the security information data store 128, the obfuscation encoding system 110 may trigger the security information generator 124 within the hardware security module 120 to generate security information corresponding to the request at 217. For example, a user may request PIN information for one of a plurality of accounts a user operates with a financial institution. Additionally or alternatively, a user may request a one-time verification code to verify their identity at a new user computing device (e.g., 104).

At 218, after retrieving and/or generating security information, the obfuscation encoding system 110 may retrieve the selected image (e.g., the image selected by the user during registration and/or reselected afterward) from the user image data store 132. After retrieving the selected image associated with the requesting user, at 222, the security information may be embedded into the selected image by the data insertion engine 130. For example, the data insertion engine 130 may embed the security information into the selected image using LSB substitution methods. The data insertion engine 130 may be configured to perform LSB substitution on specific pixels and/or groups of pixels of the selected image, where the specific bits of pixels and/or groups of pixels substituted are tracked by the obfuscation encoding system 110 and/or the obfuscation decoding system 160. LSB substitution may involve substitution of varying least significant bit levels of the one or more pixels of a selected image. For example, a configuration of LSB substitution may involve altering the 3 least significant bits of a pixel (e.g., a higher degree of noise is introduced into pixel), while another configuration results in altering the least significant bit of a pixel (e.g., a lower degree of noise is introduced into pixel).

After the selected image is embedded with security information using LSB substitution methods by the data insertion engine 130, at 226, the scrambling engine 140 may retrieve a corresponding user identifier (e.g., a 2-digit numerical identifier selected by the user). The user identifier may be retrieved from the user identifier data store 144. After retrieving the user identifier, at 230, the scrambling engine 140 may scramble elements of the embedded image (e.g., the pixels and/or groups of pixels of the image) based on the user identifier. The scrambling engine 140 may use the user identifier as a seed to perform randomization. For example, where "N" is the user identifier, the scrambling engine 140 may divide the embedded image into "N" modulus 10 parts (e.g., the number of parts is the remainder of dividing the user identifier by 10). The embedded image may be divided into parts of equal or varying size and have the location of the parts interchanged by the scrambling engine 140. After scrambling of the embedded image by the scrambling engine 140, at 234, the scrambled image may be encrypted by the encryption engine 150. In some cases, the scrambled image may be encrypted using PGP encryption techniques, where the encryption engine 150 uses a public key associated with the requesting user to encrypt the image. After encryption of the scrambled image by the encryption engine 150 at 234, the obfuscation encoding system 110 may store the encrypted image in a secured image data store 136 at 238, where the secured image data store 136 is accessible within the enterprise computing system 108, such as by the user interface module 180 and/or the obfuscation decoding system 160 via one or more networks (e.g., the network 114). Additionally or alternatively, at 238, the encrypted image may be transmitted by the obfuscation encoding system 110. The encrypted image may be transmitted and/or sent to the user for display by the user interface module 180 at the user application 107 of the user device 106. In some cases, the encrypted image may be transmitted via one or more networks (e.g., the network 114, the external network 118), where the encrypted image may be received at the user interface module 180 and accessed within the user application 107 of user device 106 via external network 118. In some cases, the encrypted image may be transmitted directly to the user device 106 via one or more networks (e.g., the network 114, the external network 118).

Figure 3:
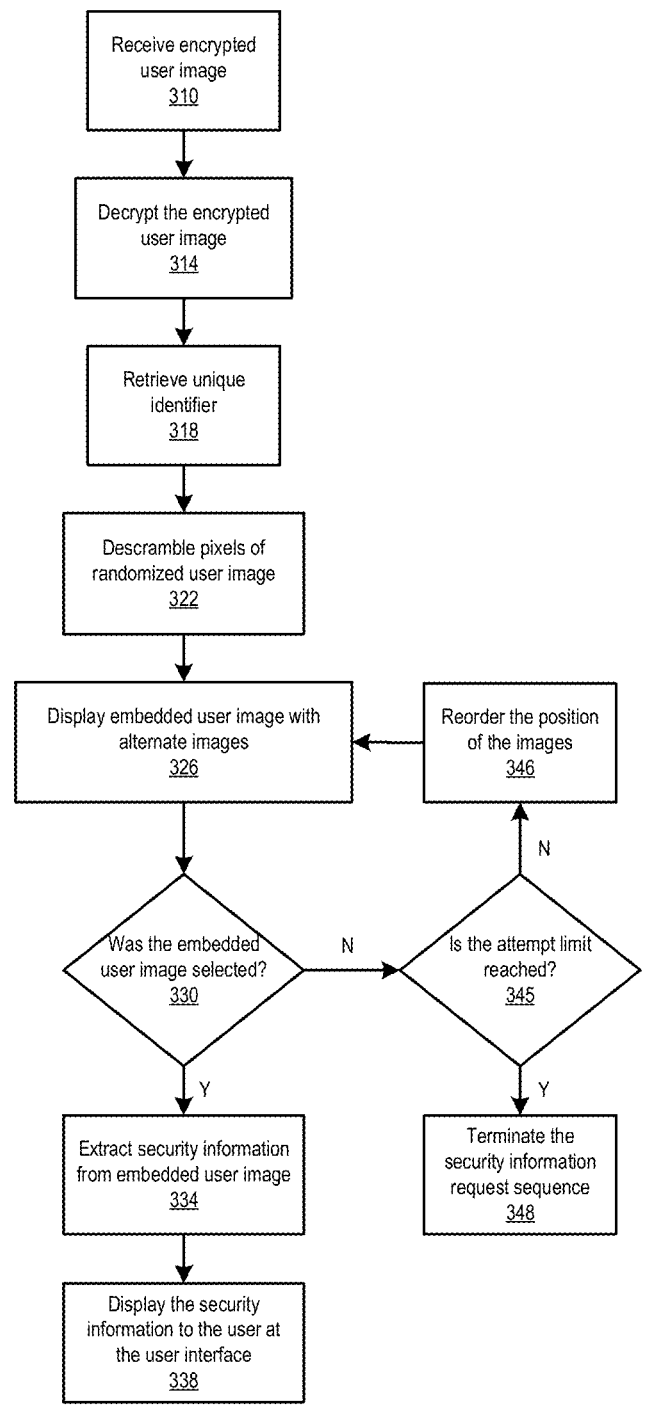
FIG. 3 depicts an illustrative event sequence for reception and decoding of security information according to aspects of this disclosure.

FIG. 3 depicts an illustrative event sequence for reception and decoding of security information according to aspects of this disclosure. The events shown in the illustrative event sequence are illustrative and additional events may be added, or events may be omitted, without departing from the scope of the disclosure. At 310, the encrypted image in the secured image data store may be accessed via one or more networks (e.g., the network 114, the external network 118) by the obfuscation decoding system 160 and/or the user interface module 180. In some cases, the encrypted image may be received at the user interface module 180 via the obfuscation decoding system 160. In some cases, at 310, the encrypted image may be received at the user interface module 180, where the user interface module 180 is accessed by the user application 107 of the user device 106 via external network 118. In some cases, the encrypted image may be received at the user device 106, where the encrypted image is accessed in the user application 107. After the encrypted image is received at 310, the obfuscation decoding system 160 may access the user interface module 180 via one or more networks (e.g., the network 114, the external network 118) to decrypt the encrypted image at 314. The decryption engine 170 of the obfuscation decoding system 160 may decrypt the encrypted image using the PGP decryption techniques, where the decryption engine 170 uses a private key associated with the user to decrypt the encrypted image. Additionally or alternatively, the obfuscation decoding system 160 may access the user application 107 via one or more networks (e.g., the network 114, the external network 118) to decrypt the encrypted image at 314. After the encrypted image is decrypted at 314, the descrambling engine 174 may retrieve the corresponding user identifier (e.g., a 2-digit numerical identifier selected by the user) from the user identifier data store 144 at 318.

After the retrieving the user identifier at 318, the descrambling engine 174 may descramble the scrambled location of the pixels and/or groups of pixels of the scrambled image at 322. The scrambled image may have previously been scrambled by the scrambling engine 140 of the enterprise computing system 108. The operation of the descrambling engine 174 may be based on the user identifier and specific pattern and/or random technique used by the scrambling engine 140 to alter the location of the pixels and/or groups of pixels of the scrambled image. For example, the retrieved user identifier may be "79" and the descrambling engine 174 may be configured to determine the number of parts of a scrambled image to be modulus 10 (e.g., the remainder after dividing by 10) of the user identifier. As such, the descrambling engine 174 may determine the image to be divided into 9 parts. Based on the 9 divided parts of the scrambled image, the descrambling engine 174 may operate on the scrambled image based on the configured known randomization sequence that was originally used to scramble the location of the parts of the scrambled image. Performing the inverse of the scrambling process of the scrambling engine 140 may produce the embedded image, where the embedded image may be the selected image from the user image data store 132, with the selected image containing embedded information.

After the embedded image is recovered by the descrambling engine 174 at 322, the obfuscation decoding system 160 may display the embedded image at the user interface module 180 at 326. The obfuscation decoding system 160 may display one or more additional images with the embedded image and display instructions at the user interface module 180 accessed by the user computing device (e.g., 102) and/or user device (e.g., 106) to select the embedded image (e.g., the image selected by the user at registration with the enterprise organization). In some cases, the user interface module 180 may be accessed within a user application (e.g., 107) included in a user device (e.g., 106). The obfuscation decoding system 160 and/or user interface module 180 may be configured to allow a maximum number of selection attempts. For example, a user may be allowed a maximum of 4 attempts to select the embedded image. After the user at the user computing device (e.g., 102) and/or user device (e.g., 106) accessing the user interface module 180 selects an image from the images displayed, the obfuscation decoding system 160 may determine if the user selected the embedded image at 330. If the embedded image was not selected, the obfuscation decoding system 160 and/or the user interface module 180 may determine if the maximum number of selection attempts has been reached at 345. If the maximum number of selection attempts has not been reached at 345, the obfuscation decoding system 160 and/or user interface module 180 may randomly reorder the positions of the images displayed at the user interface module 180 at 346. After reordering the positions of the images at 346, the obfuscation decoding system 160 may display the embedded image with the one or more additional images for selection at the user interface module 180 at 326. If the maximum number of selection attempts has been reached and/or exceeded at 345, the obfuscation decoding system 160 and/or user interface module 180 may terminate the security information request sequence at 348 by discarding (e.g., erasing) the embedded image.

If the embedded image was determined to be selected at 330, the data extraction engine 178 of the obfuscation decoding system 160 may extract the security information embedded in the embedded image at 334. The data extraction engine 178 may extract the security information from the embedded image using inverse LSB substitution methods. The data extraction engine 178 may be configured to perform inverse LSB substitution on the specific bits of pixels and/or areas of the embedded image where the data insertion engine 130 previously inserted the security information into the selected image. After extraction of the bit information representing the security information, the bit information may be converted to alphanumeric and/or non-alphanumeric characters of the security information. At 338, the security information may be displayed at the user interface module 180 for access by the user computing device (e.g., 102) and/or user device (e.g., 106) via one or more networks (e.g., the external network 118).

Figure 4:
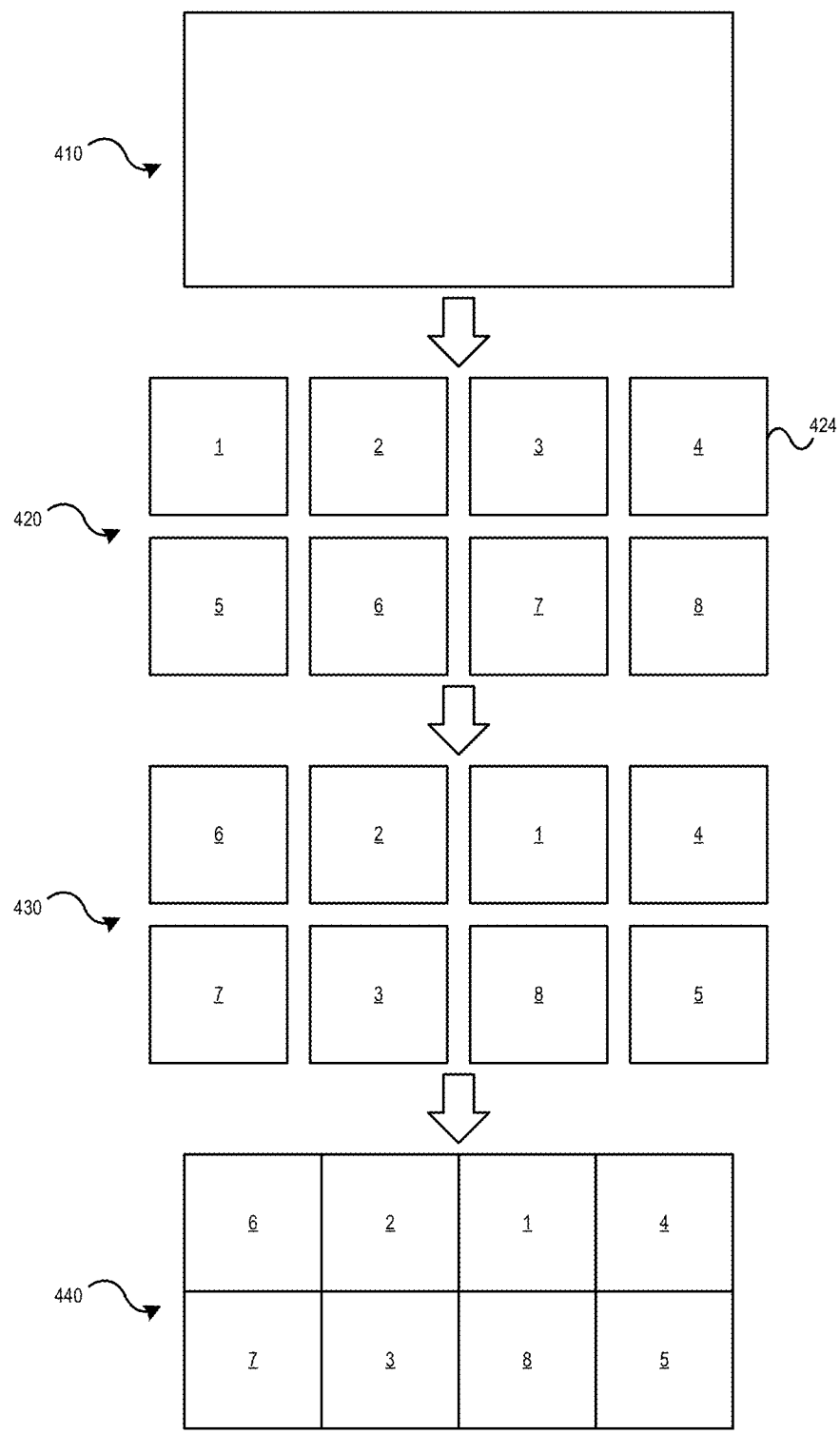
FIG. 4 depicts an illustrative image scrambling procedure according to aspects of this disclosure.

FIG. 4 depicts an illustrative image scrambling procedure according to aspects of this disclosure. In some cases, an image 410 may be selected for association with a user. The image 410 may be stored in the user image data store 132. In some cases, the image 410 may be retrieved from the user image data store 132 by the obfuscation encoding system 110. After retrieving the image 410, the data insertion engine 130 may embed security information (e.g., a PIN) into the image 410. The data insertion engine 130 may embed security information into the image 410 through the application of LSB substitution methods. In some cases, LSB substitution methods may include modifying the image 410 by modifying one or more individual bits of one or more pixels of the image 410. After embedding security information into the image 410, the scrambling engine 140 may divide the image 410 into a plurality of parts to form a divided image 420. The parts of the divided image 420 (e.g., the part 424) may be of varying or equal size. For example, the divided image 420 may be 8 sections of equal size as a result of the scrambling engine 140 operating on the image 410. The number of sections of the plurality may be based on the user identifier selected by the user associated with the image 410. For example, the image 410 may be divided into 8 sections to form the divided image 420 based on modulus 10 of the user identifier, where the user identifier is a numerical figure (e.g., 28, 58, 98).

After the image 410 is divided by the scrambling engine 140 to form the divided image 420, the scrambling engine 140 may scramble (e.g., rearrange) the positions of the sections of the divided image 420 to form a scrambled image 430. For example, the position of section 2 of the divided image 420 may be the position of section 2 of the scrambled image 430 and the position of section 3 of the divided image 420 may be the position of section 1 of the scrambled image 430 in accordance with FIG. 4. The positions of the sections of the divided image 420 may be scrambled randomly and/or by a specific pattern according to the scrambling engine 140. After the positions of the sections of the divided image 420 are scrambled to form the scrambled image 430, the scrambling engine 140 may combine the sections of the scrambled image 430 to form the image 440. The scrambling engine 140 may combine the sections of the scrambled image 430 within the original dimensions of the image 410 to form the image 440 (e.g., the image 440 will have dimensions equivalent to the image 410).

Figure 5:
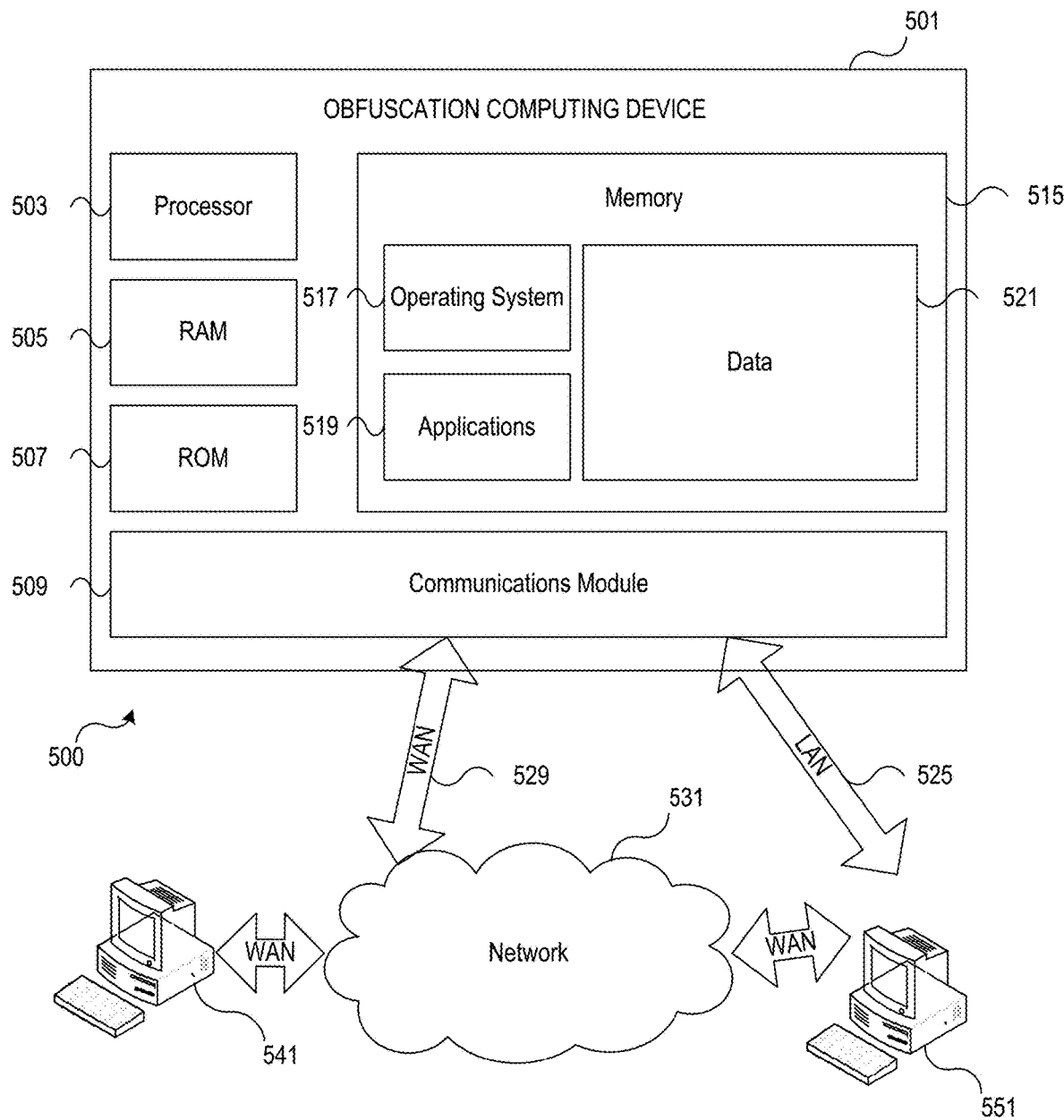
FIG. 5 shows an illustrative operation complexity graph operating environment in which various aspects of the disclosure may be implemented in accordance with one or more aspects described herein.

FIG. 5 shows an illustrative operating environment in which various aspects of the present disclosure may be implemented in accordance with one or more example embodiments. Referring to FIG. 5, a computing system environment 500 may be used according to one or more illustrative embodiments. The computing system environment 500 is only one example of a suitable computing environment and is not intended to suggest any limitation as to the scope of use or functionality contained in the disclosure. The computing system environment 500 should not be interpreted as having any dependency or requirement relating to any one or combination of components shown in the illustrative computing system environment 500.

The computing system environment 500 may include an illustrative obfuscation computing device 501 having a processor 503 for controlling overall operation of the obfuscation computing device 501 and its associated components, including a Random Access Memory (RAM) 505, a Read-Only Memory (ROM) 507, a communications module 509, and a memory 515. The obfuscation computing device 501 may perform the functionality of one or more of the obfuscation encoding system 110, the obfuscation decoding system 160, the hardware security module 120, the security information data store 128, the user image data store 132, the secured image data store 136, user identifier data store 144, secure computing system 190, and user interface module 180. The obfuscation computing device 501 may include a variety of computer readable media. Computer readable media may be any available media that may be accessed by the obfuscation computing device 501, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the obfuscation computing device 501.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 503 of the obfuscation computing device 501. Such a processor may execute computer-executable instructions stored on a computer-readable medium.

Software may be stored within the memory 515 and/or other digital storage to provide instructions to the processor 503 for enabling the obfuscation computing device 501 to perform various functions as discussed herein. For example, the memory 515 may store software used by the obfuscation computing device 501, such as an operating system 517, one or more application programs 519, and/or an associated database 521. In addition, some or all of the computer executable instructions for the obfuscation computing device 501 may be embodied in hardware or firmware. Although not shown, the RAM 505 may include one or more applications representing the application data stored in the RAM 505 while the obfuscation computing device 501 is on and corresponding software applications (e.g., software tasks) are running on the obfuscation computing device 501.

The communications module 509 may include a microphone, a keypad, a touch screen, and/or a stylus through which a user of the obfuscation computing device 501 may provide input, and may include one or more of a speaker for providing audio output and a video display device for providing textual, audiovisual and/or graphical output. The computing system environment 500 may also include optical scanners (not shown).

The obfuscation computing device 501 may operate in a networked environment supporting connections to one or more remote computing devices, such as the computing devices 541 and 551. The computing devices 541 and 551 may be personal computing devices or servers that include any or all of the elements described above relative to the obfuscation computing device 501.

The network connections depicted in FIG. 5 may include a Local Area Network (LAN) 525 and/or a Wide Area Network (WAN) 529, as well as other networks. When used in a LAN networking environment, the obfuscation computing device 501 may be connected to the LAN 525 through a network interface or adapter in the communications module 509. When used in a WAN networking environment, the obfuscation computing device 501 may include a modem in the communications module 509 or other means for establishing communications over the WAN 529, such as a network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 6:
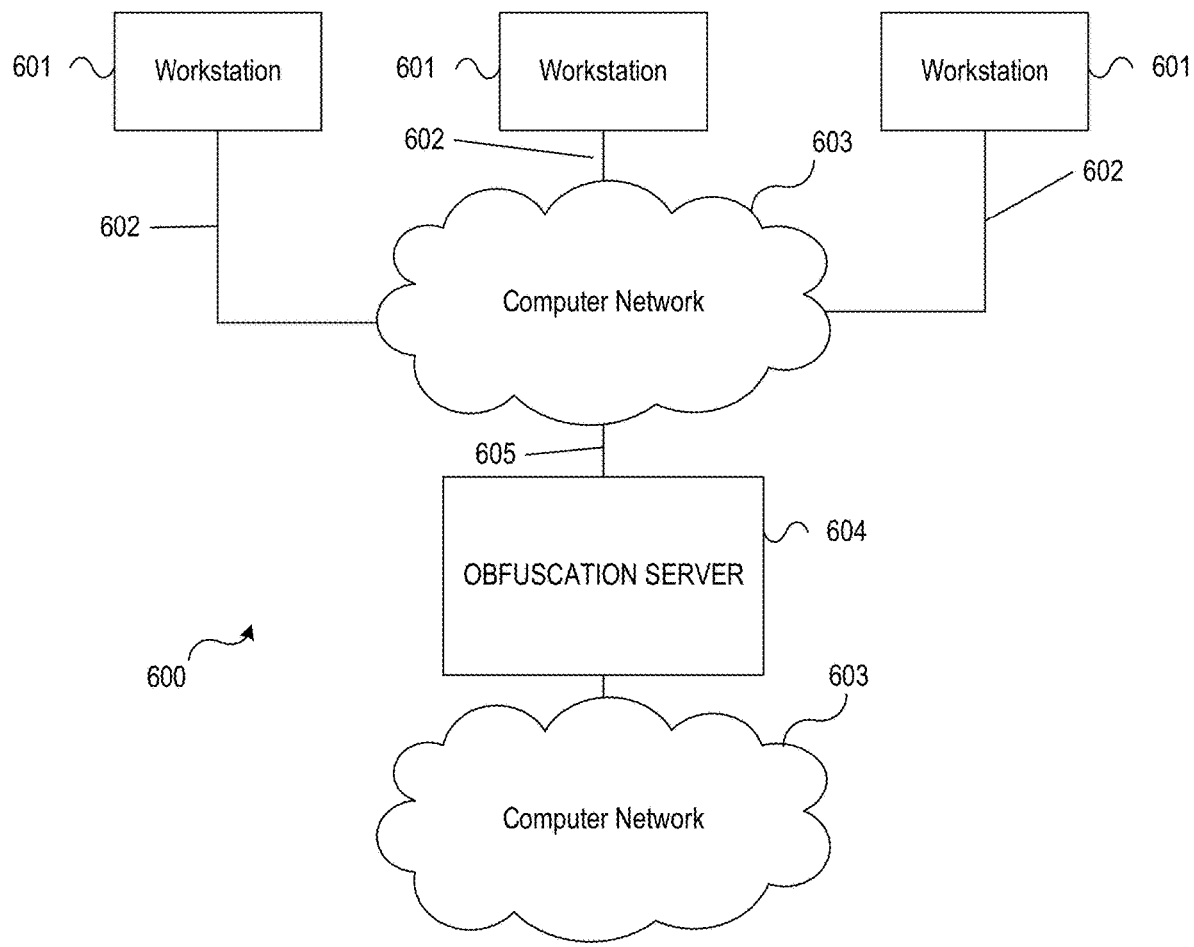
FIG. 6 shows an illustrative block diagram of workstations and servers that may be used to implement the processes and functions of certain aspects of the present disclosure in accordance with one or more aspects described herein.

FIG. 6 shows an illustrative block diagram of workstations and servers that may be used to implement the processes and functions of certain aspects of the present disclosure in accordance with one or more example embodiments. For example, an illustrative system 600 may be used for implementing illustrative embodiments according to the present disclosure. As illustrated, the system 600 may include one or more workstation computers 601. The workstations 601 may be, for example, a desktop computer, a smartphone, a wireless device, a tablet computer, a laptop computer, and the like, configured to perform various processes described herein. The workstations 601 may be local or remote, and may be connected by one of the communications links 602 to a computer network 603 that is linked via the communications link 605 to the obfuscation server 604. In the system 600, the obfuscation server 604 may be a server, processor, computer, or data processing device, or combination of the same, configured to perform the functions and/or processes described herein. The obfuscation server 604 may be used to perform the functionality of one or more of the obfuscation encoding system 110, the obfuscation decoding system 160, the hardware security module 120, the security information data store 128, the user image data store 132, the secured image data store 136, user identifier data store 144, secure computing system 190, and user interface module 180, and the like.

The computer network 603 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 602 and 605 may be communications links suitable for communicating between the workstations 601 and the obfuscation server 604, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in some embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

The invention claimed is:

1. A computing platform, comprising:

at least one processor;

a communication interface communicatively coupled to the at least one processor; and memory storing computer-readable instructions that, when executed by the one or more processors, cause the computing platform to:

select, by a user and from a plurality of images stored in an image data store, an image, wherein selection of the image is performed during a user identification process;

associate the image to a user identifier;

embed, by an encoding system of the computing platform, security information in the image to form an embedded image, wherein the security information is associated with the user identifier, wherein the security information corresponds to enabling user access to secure or private information provided through use of an enterprise computing system;

scramble, by the encoding system and based on an obfuscation scheme corresponding to a user identifier, the embedded image to form a scrambled image, wherein pixels of the embedded user image are scrambled based on a portion of the user identifier to produce the scrambled image, wherein the portion of the user identifier is numerical having a value 'N', and wherein the scrambling is based on dividing the image into 'N' modulus parts;

store the scrambled image in a secure data repository;

retrieve, based on a user request and from the secure data repository, the scrambled image;

display, by a user interface of a remote computing device, the embedded image among a plurality of images for selection, wherein the embedded image is obtained from the scrambled image;

extract, by a decoding system of the computing platform and based on a successful selection of the embedded image, the security information from the embedded image;

discard, by the decoding system and based on a selection failure for exceeding a selection limit for the plurality of images, the embedded image;

display, by the user interface of the remote computing device, the security information as extracted from the embedded image; and initiate access, by a user device via a secure network and based on the security information, to a secure computing system and wherein the security information comprises a personal identification number.

2. The computing platform of claim 1, wherein the instructions, when executed by the one or more processors, cause the computing platform to:

generate, by a security information generator of a hardware security module, the security information.

3. The computing platform of claim 1, wherein the instructions, when executed by the one or more processors, cause the computing platform to:

descramble, by the decoding system and based on the user identifier, the scrambled image to form the embedded image.

4. The computing platform of claim 1, wherein the instructions, when executed by the at least one processor, cause the encoding system to form the scrambled image by causing the computing platform to:

divide, by the encoding system and based on the user identifier, the embedded image into a plurality of sections; and arrange, by the encoding system and based on the user identifier, the plurality of sections within dimensions of the embedded image.

5. The computing platform of claim 1, wherein the instructions, when executed by the one or more processors, cause the computing platform to:

encrypt, by the encoding system and based on a public key associated with the user, the scrambled image.

6. The computing platform of claim 1, wherein the instructions, when executed by the one or more processors, cause the computing platform to:

decrypt, by the decoding system and based on a key associated with the user, the scrambled image.

7. The computing platform of claim 1, wherein the instructions, when executed by the one or more processors, cause the computing platform to:

insert, by the encoding system and using least significant bit substitution, the security information into a binary representation of pixels of the image.

8. A method, comprising:

embedding, by an encoding system of a computing platform, security information in an image to form an embedded image, wherein the security information is associated with a user;

scrambling, by the encoding system and based on a user identifier, the embedded image to form a scrambled image, wherein pixels of the embedded user image are scrambled based on a portion of the user identifier to produce the scrambled image, wherein the portion of the user identifier is numerical having a value 'N', and wherein the scrambling is based on dividing the image into 'N' modulus parts;

displaying, by a user interface of a remote computing device, the embedded image among a plurality of images for selection;

extracting, by a decoding system of the computing platform and based on a successful selection of the embedded image, the security information from the embedded image;

discarding, by the decoding system and based on a selection failure for exceeding a selection limit for the plurality of images, the embedded image; and displaying, by the user interface of the remote computing device and after extraction of the security information from the embedded image, the security information.

9. The method of claim 8, comprising:

selecting, by the user interface of the remote computing device, the image for association with the user.

10. The method of claim 8, comprising:

defining, by the user interface of the remote computing device, the user identifier, wherein the user identifier is a numerical figure.

11. The method of claim 8, comprising:

descrambling, by the decoding system and based on the user identifier, the scrambled image to form the embedded image.

12. The method of claim 8, comprising:

retrieving, by the encoding system, the security information from a security information data store.

13. The method of claim 8, wherein the encoding system forming the scrambled image comprises:

dividing, by the encoding system and based on the user identifier, the embedded image into a plurality of sections; and arranging, by the encoding system and based on the user identifier, the plurality of sections within dimensions of the embedded image.

14. The method of claim 8, comprising:
inserting, by the encoding system and using least significant bit substitution, the security information into a binary representation of pixels of the image.

15. The method of claim 8, comprising:
selecting, by the user interface of the remote computing device, the embedded image among the plurality of images.

16. One or more non-transitory computer-readable media storing instructions that, when executed by a computing platform comprising one or more processors, memory, and a communication interface, cause the computing platform to:
embed, by an encoding system of the computing platform, security information in an image to form an embedded image, wherein the security information is associated with a user;
scramble, by the encoding system and based on a user identifier, the embedded image to form a scrambled image, wherein pixels of the embedded user image are scrambled based on a portion of the user identifier to produce the scrambled image, wherein the portion of the user identifier is numerical having a value 'N', and wherein the scrambling is based on dividing the image into 'N' modulus parts;
transmit, by the encoding system and via a network, the scrambled image to a user device, where the user device is associated with a user application;
descramble, by a decoding system of the computing platform and based on the user identifier, the scrambled image to form the embedded image;
display, by a user interface of the user application, the embedded image among a plurality of images for selection;
extract, by the decoding system and based on a successful selection of the embedded image, the security information from the embedded image;
discard, by the decoding system and based on a selection failure for exceeding a selection limit for the plurality of images, the embedded image; and
display, by the user interface of the user application after the successful selection of the embedded image and extraction of the security information, the security information.

17. The one or more non-transitory computer-readable media of claim 16, wherein the instructions, when executed by the one or more processors, cause the computing platform to:
receive, from a remote computing device, a request for the security information; and
generate, by a computing device, the security information.

18. The one or more non-transitory computer-readable media of claim 16, wherein the instructions, when executed by the one or more processors, cause the computing platform to:
insert, by the encoding system and using least significant bit substitution, the security information into a binary representation of pixels of the image.

19. The one or more non-transitory computer-readable media of claim 16, wherein the instructions, when executed by the one or more processors, cause the encoding system to form the scrambled image by causing the computing platform to:
divide, by the encoding system and based on the user identifier, the embedded image into a plurality of sections; and
arrange, by the encoding system and based on the user identifier, the plurality of sections within dimensions of the embedded image.

* * * * *